United States Patent
Ni et al.

(10) Patent No.: US 10,712,604 B2
(45) Date of Patent: Jul. 14, 2020

(54) DISPLAY PANEL AND METHOD FOR MANUFACTURING THE SAME

(71) Applicants: BOE Technology Group Co., Ltd., Beijing (CN); HEFEI XINSHENG OPTOELECTRONICS TECHNOLOGY CO., LTD., Anhui (CN)

(72) Inventors: Huan Ni, Beijing (CN); Fengzhen Lv, Beijing (CN); Xinxia Zhang, Beijing (CN); Chengpeng Yao, Beijing (CN); Xiao Guo, Beijing (CN); Xiaolong Xie, Beijing (CN); Qun Li, Beijing (CN); Kui Lv, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/798,707

(22) Filed: Oct. 31, 2017

(65) Prior Publication Data
US 2018/0120627 A1    May 3, 2018

(30) Foreign Application Priority Data
Oct. 31, 2016    (CN) .......................... 2016 1 0927773

(51) Int. Cl.
G02F 1/1335    (2006.01)
G02F 1/1341    (2006.01)
G02F 1/1339    (2006.01)

(52) U.S. Cl.
CPC ...... G02F 1/133512 (2013.01); G02F 1/1339 (2013.01); G02F 1/1341 (2013.01); *G02F 2202/023* (2013.01); *G02F 2202/025* (2013.01)

(58) Field of Classification Search
CPC ......... G02F 1/136209; G02F 1/133512; G02F 1/1341; G02F 2202/023; G02F 2203/025
(Continued)

(56) References Cited

U.S. PATENT DOCUMENTS 6,157,480 A  * 12/2000  Anderson ............... G02F 1/161
                                                            359/265
7,349,056 B2    3/2008  Kim et al.
(Continued)

FOREIGN PATENT DOCUMENTS

| CN | 1945400 A | 4/2007 |
| CN | 104730739 A | 6/2015 |
| TW | 200530327 A | 9/2005 |

OTHER PUBLICATIONS

Office Action dated Jan. 21, 2019 issued in corresponding Chinese Application No. 201610927773.3.
Capsule dispersion, pp. 374-383.

*Primary Examiner* — Binh X Tran
(74) *Attorney, Agent, or Firm* — Nath, Goldberg & Meyer; Joshua B. Goldberg

(57) ABSTRACT

The present invention provides a display panel and a method for manufacturing the same. The method comprises steps of forming a black matrix and forming a sealant, wherein the black matrix layer contains a thermochromic material at the position corresponding to the sealant, so that when the sealant is cured with ultraviolet light, the thermochromic material layer is transparent. In such case, a side of the first substrate away from the sealant can be irradiated and ultraviolet light passes through the first substrate and the thermochromic material to cure the sealant, thus achieving a uniform irradiation of ultraviolet light and a high curing efficiency. After the sealant is cured, the thermochromic
(Continued)

material can become black by changing the temperature thereof so as to avoid the light leakage.

9 Claims, 4 Drawing Sheets

(58) Field of Classification Search
USPC .................................................. 216/4, 5, 24
See application file for complete search history.

(56) References Cited

U.S. PATENT DOCUMENTS

| | | |
|---|---|---|
| 7,872,710 B2 | 1/2011 | Lee et al. |
| 2006/0135029 A1* | 6/2006 | Harada ............... H01L 51/5246 445/25 |
| 2007/0081118 A1* | 4/2007 | Lee .................. G02F 1/133512 349/153 |
| 2008/0050663 A1* | 2/2008 | Kawakami ............. B32B 27/18 430/14 |
| 2009/0278090 A1* | 11/2009 | Lucht ..................... B41M 5/284 252/408.1 |
| 2014/0177029 A1* | 6/2014 | Liu ....................... G02F 1/0147 359/288 |
| 2016/0381821 A1 | 12/2016 | Xiao et al. |
| 2017/0028763 A1* | 2/2017 | Arsenault ............ G02F 1/0147 |
| 2017/0260446 A1* | 9/2017 | Washizu ................ C01G 31/02 |

* cited by examiner

DISPLAY PANEL AND METHOD FOR MANUFACTURING THE SAME

FIELD OF THE INVENTION

The present invention relates to the field of display technology, particularly to a display panel and a method for manufacturing the same.

BACKGROUND OF THE INVENTION

In the conventional manufacture process of a liquid crystal display panel, a process of assembling and aligning a second substrate (TFT) and a first substrate (CF) into a liquid crystal cell is comprised, wherein the first substrate and the second substrate are assembled and aligned by curing a sealant. In order to prevent the contamination of liquid crystal by the sealant, the sealant is generally pre-cured via ultraviolet light before it is heat-cured fully.

Currently, due to the narrow frame design of the liquid crystal display panel, the sealant is typically disposed on the black matrix of the first substrate, which results that the black matrix would block the ultraviolet light irradiated onto the sealant when the ultraviolet light is irradiated from above of the first substrate.

In the prior art, the side of the second substrate is placed upward to receive the irradiation of the ultraviolet light, so it is necessary to make the second substrate contact the sealant contact and to make the metal wiring near the sealant latticed, which would reduce the transmission capacity of the metal wiring and the irradiation efficiency. Moreover, a side effect of temperature raise of the liquid crystal display panel would be caused because a large part of the ultraviolet light is wasted, which would result in the decrease of the viscosity of the sealant, poor fitting and leakage of liquid crystal. In addition, due to the uneven irradiation of the ultraviolet light, the internal luminance of the liquid crystal cell is uneven and the local irradiation amount is not enough, which would cause the insufficient curing of the sealant and contamination of liquid crystal by the sealant material, thus bringing forth defects.

SUMMARY OF THE INVENTION

In order to overcome the above-mentioned problems in the prior art, the present invention provides a display panel and a method for manufacturing the same. The method for manufacturing the display panel comprises the following steps:

forming a black matrix on a first substrate;
disposing a sealant;
wherein the black matrix layer contains a thermochromic material at the position corresponding to the sealant;
irradiating a side of the first substrate away from the sealant to cure the sealant, wherein the thermochromic material keeps transparent before the completion of curing; and
changing the temperature to make the thermochromic material become black.

For example, a raw material containing the thermochromic material can be used to form a whole layer of the black matrix on the first substrate, and the whole layer of black matrix can be patterned.

Alternatively, a black material can be used to form the black matrix layer in the non-display region of the first substrate, wherein part of the black matrix layer at the position corresponding to the sealant is kept blank, and a layer comprising the thermochromic material is formed at such position.

Specifically, a black material can be used to form the black matrix layer in the non-display region of the first substrate, wherein part of the black matrix layer at the position corresponding to the sealant is kept blank, and a sealant comprising thermochromic material is disposed only at such position, and a sealant without thermochromic material is disposed at the edge position between the black matrix layer and the second substrate.

Alternatively, a black material can be used to form the black matrix layer in the non-display region of the first substrate, wherein part of the black matrix layer at the position corresponding to the sealant is kept blank, and a sealant comprising thermochromic material is disposed both at such position and at the edge position between the black matrix layer and the second substrate.

The sealant comprising the thermochromic material further includes a sealant base material, wherein the mass ratio of the sealant base material to the thermochromic material is 1: (0.01-0.2).

Part of the black matrix at the position corresponding to the sealant in the black matrix layer being kept blank may be achieved at the same time of forming the black matrix in the non-display region using a mask plate, or by photoetching and developing the black matrix at the position corresponding to the sealant after the black matrix is formed in the whole non-display region.

The thermochromic material comprises an irreversible chromatic material and a reversible chromatic material.

The thermochromic material comprises an organic thermochromic material and an inorganic thermochromic material.

The organic thermochromic material may be one or two materials selected from triarylmethane and fluorane.

For example, the organic thermochromic material comprises

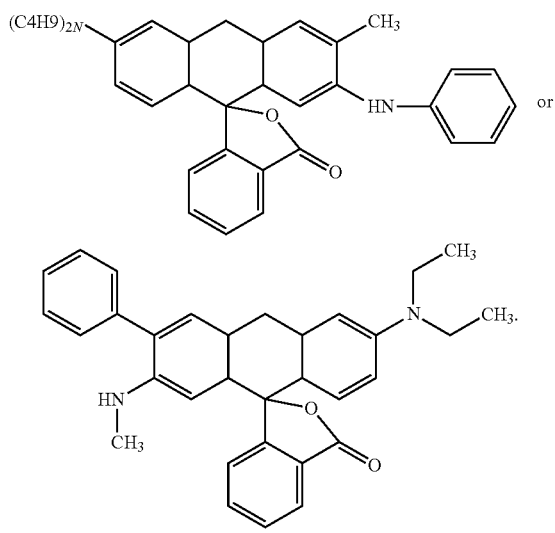

For example, the inorganic thermochromic material may comprise a mixture of $PbCO_3/Pb(OH)_2/ZnS$, or $(NH_4)VO_3$.

The thermochromic material may comprise a microcapsule with an inorganic thermochromic material as a core material and a high molecular material as a shell material.

The microcapsule has a particle size between 10 nm to 120 nm.

The present invention further provides a display panel manufactured from the above method.

REFERENCES 1. the first substrate; 2. the second substrate; 3. black matrix; 4. thermochromic material; 5. sealant.

DETAILED DESCRIPTION OF EMBODIMENTS

The present invention will be further described in detail with reference to the accompanying drawings and specific embodiments in order to provide a better understanding of the technical solutions of the present invention by those skilled in the art.

Figure 1:
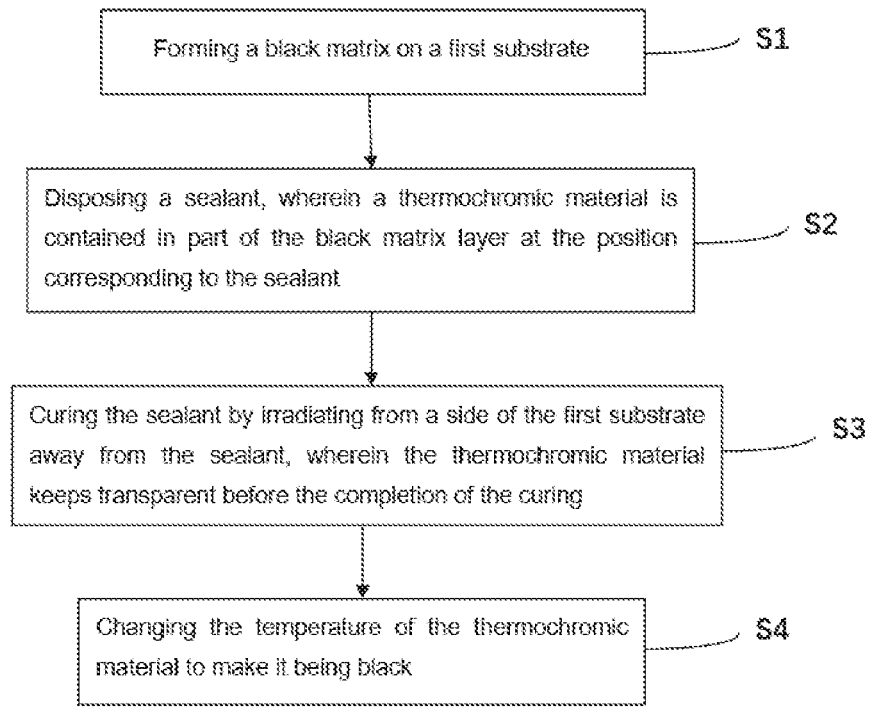
FIGS. 1 to 7 are flowcharts for manufacturing the display panels according to examples of the present invention.

As shown in FIG. 1, the present invention provides a method for manufacturing a display panel, comprising:

S1. forming a black matrix on the first substrate;

S2. disposing a sealant, wherein the black matrix layer contains a thermochromic material at the position corresponding to the sealant;

S3. irradiating a side of the first substrate away from the sealant to cure the sealant, wherein the thermochromic material keeps transparent before the completion of curing; and S4. changing the temperature to make the thermochromic material become black.

The thermochromic material may comprise an organic thermochromic material or an inorganic thermochromic material.

For example, the inorganic thermochromic material may be a mixture of $PbCO_3/Pb(OH)_2/ZnS$, or $(NH_4)VO_3$.

The chromatic principle of $PbCO_3/Pb(OH)_2/ZnS$ is as follows: the color thereof is changed from colorless to black by a thermochemical reaction under a thermochromic reactive temperature of about 130° C.; and the chromatic principle of $(NH_4)VO_3$ is as follows: the color thereof is changed from white to black by a thermal decomposition reaction under a temperature of about 170° C.

For example, the organic thermochromic material may be one or two materials selected from triarylmethane or fluorane.

The chromatic principle of these organic thermochromic materials is as follows: with energy provided by heat, light and the like, intramolecular cyclization of the organic molecule would occur, which results in the color change.

For example, the organic thermochromic material may comprise

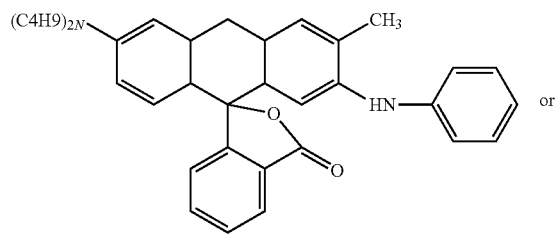

or

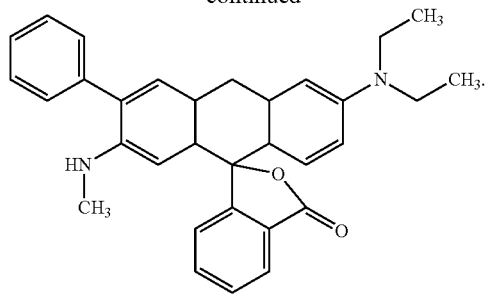

The organic thermochromic material can change color by irradiation with UV light having a wavelength between 250 nm to 380 nm.

For example, the thermochromic material may comprise a microcapsule with an inorganic thermochromic material as a core material and a high molecular material as a shell material. The microcapsule has a particle size between 10 nm to 120 nm.

That is to say, when the black matrix 3 or the base material of the sealant 5 is made of organic material, the compatibility of inorganic thermochromic material and organic base material is poor. In such case, a microcapsule with a particle size of 10-120 nm, which is prepared by microcapsule technology and has an inorganic thermochromic material as a core material and a high molecular material as a shell material, can be used to improve the compatibility, so that the thermochromic material 4 is more even dispersed in the black matrix or the base material of the sealant, thus ensuring the uniform irradiation of ultraviolet light in the sealant 5 during curing process, and further improving the curing efficiency.

Herein a method for preparing the microcapsule is provided as below: 1% to 3% surfactant (e.g. stearic acid, sodium dodecylbenzene sulfonate and cyclohexane) and a polymer (e.g. PE, PP, PU, ethyl cellulose and so on) are dissolved in a solvent (e.g. organic solvent such as toluene and the like) under heating, and an emulsifying agent (e.g. sodium alkyl benzene sulfonate and the like) is added thereto, thereby a uniform dispersed emulsification system is obtained under high-speed stirring. Then a dispersant (e.g. sodium lauryl sulfate and the like) and an inorganic thermochromic material are added into the emulsification system, which is uniformly stirred to obtain a microcapsule dispersion. A microcapsule power with uniform size can be obtained by cooling and removing the solvent.

The method for manufacturing the display panel according to the present invention comprises the steps of forming a black matrix and forming a sealant, wherein the black matrix layer contains a thermochromic material at the position corresponding to the sealant. When the sealant is cured via ultraviolet light, the thermochromic material layer is transparent. In such case, a side of the first substrate away from the sealant can be irradiated and the ultraviolet light would pass through the first substrate and the thermochromic material layer to cure the sealant successfully, thus achieving a uniform irradiation of ultraviolet light and a high curing efficiency. After the sealant is cured, the thermochromic material layer can become black by changing the temperature thereof so as to avoid the light leakage.

The present invention also provides a display panel prepared from the above method. The display panel of the present invention is applicable to various display devices. The display devices may be any product or component having a display function such as a liquid crystal display panel, an electronic paper, a mobile phone, a tablet computer, a television set, a monitor, a notebook computer, a digital photo frame, a navigator, etc.

Example 1

The present example provides a method for manufacturing a display panel, wherein the raw material of the black matrix layer 3 of the display panel is reversible thermochromic material 4. At room temperature, the thermochromic material 4 is black so that the light in the region where the black matrix layer 3 is located would not leak, whereas it becomes transparent or purple when the temperature is raised so that the ultraviolet light can pass through. The thermochromic material 4 can return black when the temperature is reduced to room temperature.

Figure 2:
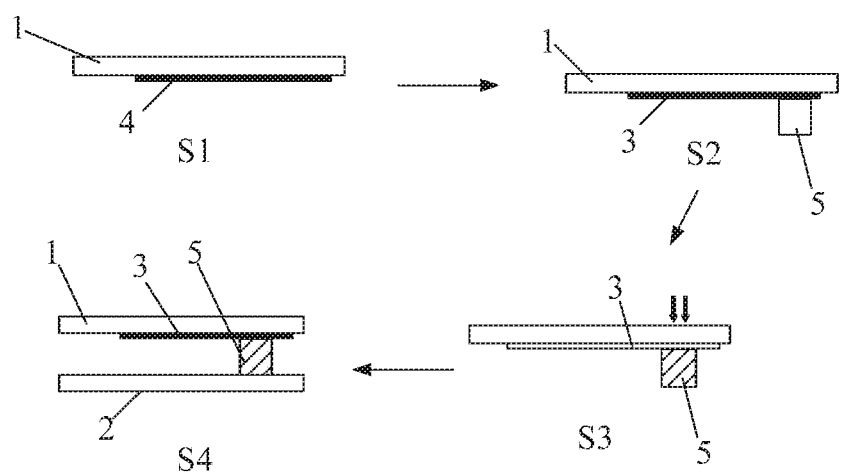

As shown in FIG. 2, the present example comprises the following steps:

S1. forming a whole black matrix layer 3 on a first substrate 1 with a raw material including a thermochromic material 4 and then patterning it, wherein the thermochromic material 4 can be photosensitive MC powder (which is also referred to as MC photochromic material);

S2. disposing a sealant 5;

S3. heating the first substrate 1 to make the black matrix 3 become transparent and irradiating a side of the first substrate 1 away from the sealant 5 to cure the sealant 5; and S4. cooling to room temperature so as to make the black matrix 3 return black.

Example 2

The present example provides a method for manufacturing a display panel, wherein the raw material of the black matrix layer 3 of the display panel is irreversible thermochromic material 4 which has a chromatic temperature of 130° C., wherein the thermochromic material 4 is a mixture of diallyl phthalate and disodium hydrogen phosphate (mass ratio 1:1).

Figure 3:
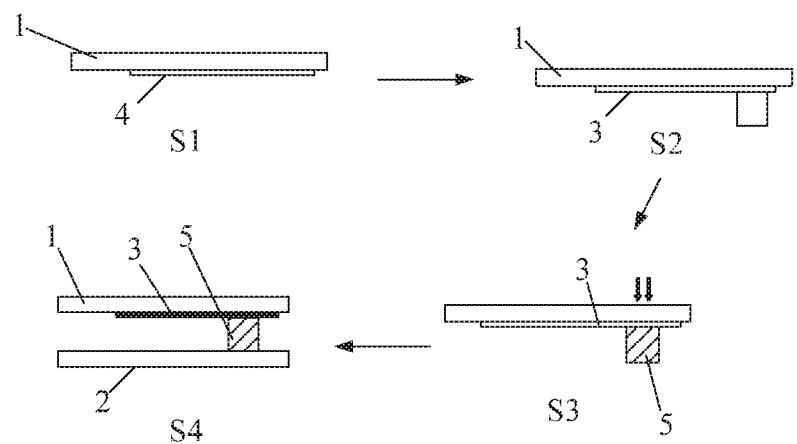

As shown in FIG. 3, the present example comprises the following steps:

S1. forming a transparent black matrix layer 3 in the non-display region of a first substrate 1 with the irreversible thermochromic material 4;

S2. disposing a sealant 5;

S3. curing the sealant 5 by ultraviolet light; and

S4. heating to 130° C. to obtain a black matrix layer 3 with black color.

Example 3

Figure 4:
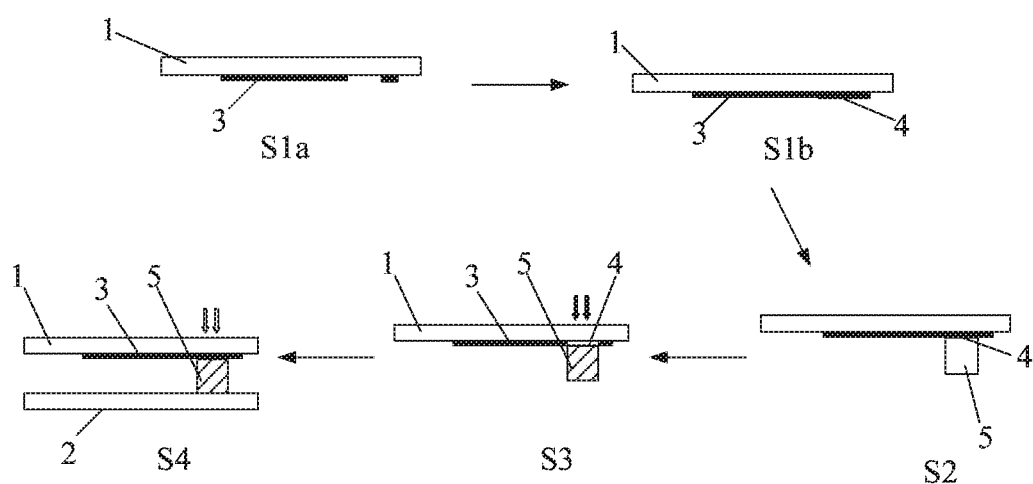

The present example provides a method for manufacturing a display panel, which comprises the following steps, as shown in FIG. 4:

S1a. forming a black matrix layer 3 in the non-display region on a first substrate 1 using the black material, and making part of the black matrix layer 3 at the position corresponding to a sealant 5 being blank. There are two ways to achieve it: one way applies one-step method which comprises directly patterning during the process of forming the black matrix layer 3 in the non-display region using a mask plate; and the other way applies two-step method which comprises firstly forming the black matrix layer 3 in the non-display region and then performing photoetching and developing of the black matrix layer 3 at the position corresponding to the sealant 5 so as to remove it;

S1b. disposing an reversible thermochromic material 4, or a mixture of the reversible thermochromic material MC powder used for forming the black matrix 3 in the above example 1 and the thermochromic material 4, or a mixture of a base material of the sealant 5 and the thermochromic material 4 at the blank position;

S2-S4, which are similar to those of example 1.

Example 4

Figure 5:
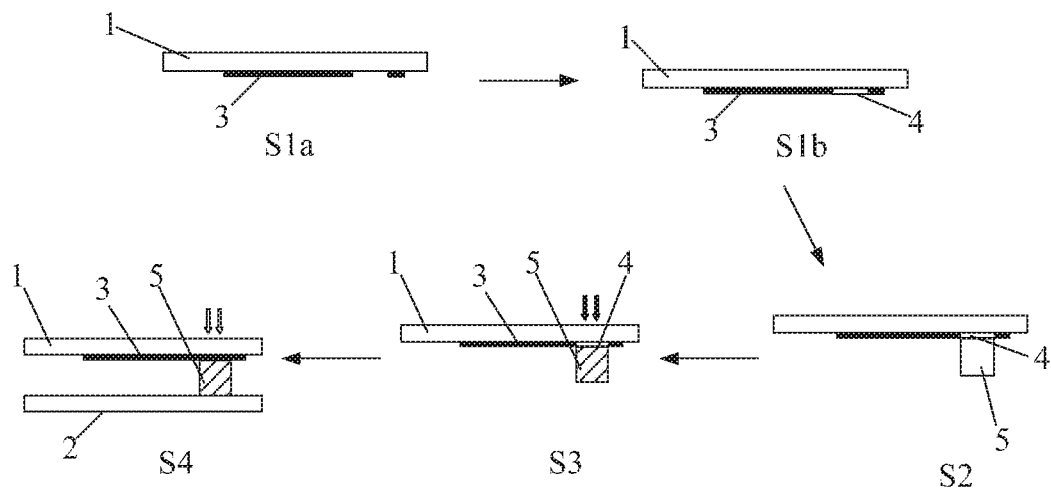

The present example provides a method for manufacturing a display panel, which comprises the following steps, as shown in FIG. 5:

S1a, which is similar to that of example 4;

S1b. disposing an transparent irreversible thermochromic material 4, or a mixture of a base material of the sealant 5 and the thermochromic material 4 at the blank position;

S2-S4, which are similar to those of example 2.

Example 5

The present example provides a method for manufacturing a display panel, which comprises the following steps:

S1. forming a black matrix layer 3 and making part of the black matrix at the position corresponding to a sealant 5 being blank according to the step S1a of example 3;

S2. forming the sealant 5 which comprises the following steps:

S2a. disposing the sealant 5 containing an reversible thermochromic material 4 only at the blank position; and S2b. disposing the sealant 5 without the reversible thermochromic material 4 at the edge position between the black matrix layer 3 and a second substrate 2;

S3. heating a first substrate 1 so as to make the sealant 5 at the blank position become colorless, and irradiating a side of the first substrate 1 away from the sealant 5 so as to cure sealant 5; and S4. cooling to room temperature so as to make the sealant 5 at the blank position become black, while the sealant at other positions is ordinary color.

Example 6

Figure 6:
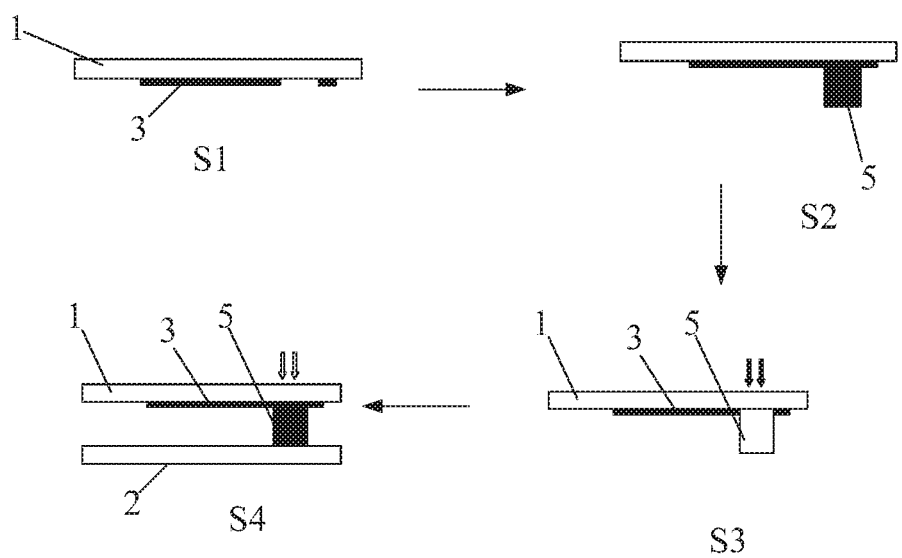

The present example provides a method for manufacturing a display panel, which comprises the following steps, as shown in FIG. 6:

S1. forming a black matrix layer 3 and making part of the black matrix at the position corresponding to a sealant 5 being blank according to the step S1a of example 3;

S2. disposing the sealant 5 containing an reversible black thermochromic material 4 both at the opening position, and at the edge position between the black matrix layer 3 and a second substrate 2;

S3. heating to make the sealant 5 containing the reversible black thermochromic material 4 become transparent and curing the sealant 5 with ultraviolet light from a side of the first substrate 1 away from the sealant 5; and S4. cooling to room temperature to obtain the black matrix layer 3 and the sealant 5 both being black color as a whole.

Example 7

Figure 7:
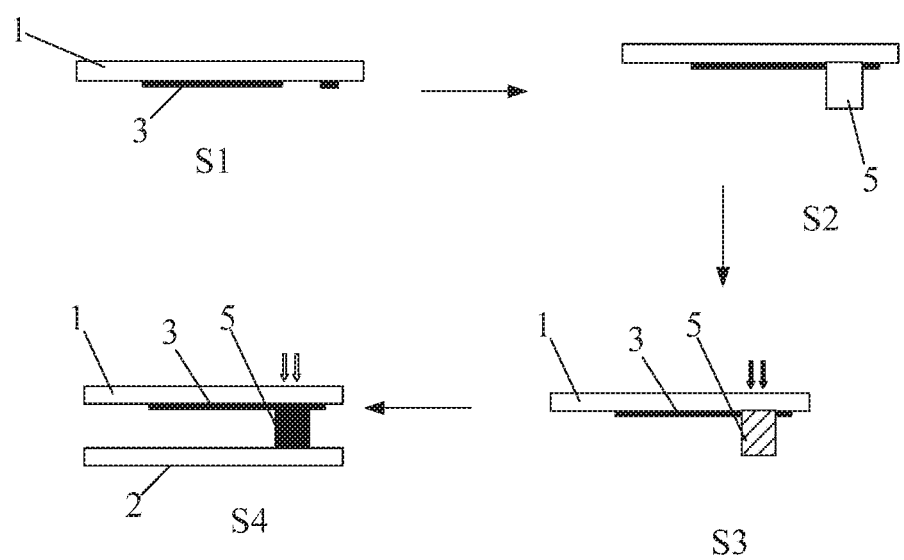

The present example provides a method for manufacturing a display panel, which comprises the following steps, as shown in FIG. 7:

S1. forming a black matrix layer 3 and making part of the black matrix at the position corresponding to a sealant 5 being blank according to the step S1a of example 3;

S2. disposing the sealant 5 containing an irreversible transparent thermochromic material 4 both at the opening position and at the edge position between the black matrix layer 3 and a second substrate 2;

S3. curing the sealant 5 with ultraviolet light; and

S4. heating to obtain the sealant 5 with black color as a whole.

Obviously, many modifications may be made to the specific embodiment of the examples described above, for example, the specific substance of the thermochromic material may be adjusted according to the properties of the black matrix material or the sealant material of the different display products, the specific formation process of the thermochromic material layer may be adjusted as required.

It should be understood that the embodiments described above are merely the exemplary embodiments for the purpose of illustrating the principles of the present invention, which shall not limit the scope of the invention. Various changes and modifications to the present invention made without departing from the scope and spirit of invention by a person skilled in the art should all be covered in the protection scope of the present invention.

The invention claimed is:

1. A method for manufacturing a display panel, characterized by comprising steps of:
   forming a black matrix on a first substrate;
   disposing a sealant;
   curing the sealant by irradiating from a side of the first substrate away from the sealant, wherein a thermochromic material keeps transparent before the completion of the curing; and
   making the thermochromic material black by changing the thermochromic material's temperature,
   wherein the step of forming a black matrix on a first substrate comprises: forming the black matrix in a non-display region with a black material and making a position corresponding to the sealant in the black matrix being blank; and
   the step of disposing a sealant comprises: disposing a sealant containing the thermochromic material and disposing a sealant without the thermochromic material, wherein the sealant containing the thermochromic material is only disposed at the blank position, whereas the sealant without the thermochromic material is disposed at an edge position between the black matrix layer and a second substrate,
   wherein an orthographic projection of the sealant containing the thermochromic material on the first substrate overlaps with an orthographic projection of the sealant without the thermochromic material in a plane parallel with the first substrate, whereas the orthographic projections of the sealants do not overlap with an orthographic projection of the black matrix on the first substrate.

2. The method for manufacturing a display panel according to claim 1, characterized in that, the sealant containing the thermochromic material further includes a sealant base material, wherein the mass ratio of the sealant base material to the thermochromic material is 1: (0.01-0.2).

3. The method for manufacturing a display panel according to claim 1, characterized in that, making a position corresponding to the sealant in the black matrix being blank comprises: directly forming the blank position at the time of forming the black matrix in the non-display region using a mask plate; or firstly forming the black matrix in the non-display region and then photoetching and developing the black matrix at the position corresponding to the sealant so as to remove it.

4. The method for manufacturing a display panel according to claim 1, characterized in that, the thermochromic material comprises an irreversible chromatic material and a reversible chromatic material.

5. The method for manufacturing a display panel according to claim 1, characterized in that, the thermochromic material comprises a microcapsule with an inorganic thermochromic material as a core material and a polymeric material as a shell material, wherein the microcapsule has a particle size between 10 nm to 120 nm.

6. The method for manufacturing a display panel according to claim 1, characterized in that, the thermochromic material comprises an organic thermochromic material and an inorganic thermochromic material.

7. The method for manufacturing a display panel according to claim 6, characterized in that, the organic thermochromic material comprises any one or two materials selected from triarylmethane and/or fluorane.

8. The method for manufacturing a display panel according to claim 6, characterized in that, the organic thermochromic material comprises

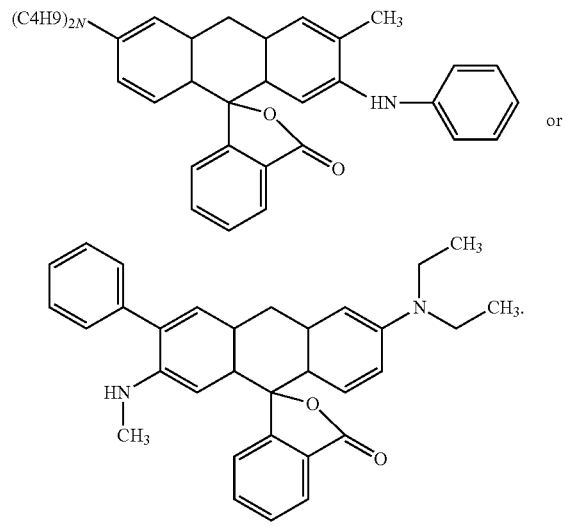

9. The method for preparing a display panel according to claim 6, characterized in that, the inorganic thermochromic material comprises $(NH_4)VO_3$ or a mixture of $PbCO_3/Pb(OH)_2/ZnS$.

* * * * *